(12) United States Patent
Patil

(10) Patent No.: US 7,124,373 B1
(45) Date of Patent: Oct. 17, 2006

(54) SYSTEM AND METHOD FOR REARRANGING RUN-TIME ORDERING OF OPEN TASKS

(75) Inventor: Rajesh V. Patil, Northboro, MA (US)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 10/045,919

(22) Filed: Jan. 9, 2002

(51) Int. Cl.
*G06F 3/00* (2006.01)
*G06F 9/46* (2006.01)

(52) U.S. Cl. ............... 715/779; 715/517; 715/518; 715/519; 715/765; 715/766; 715/767; 715/769; 715/817; 715/819; 715/818; 715/820

(58) Field of Classification Search ............... 345/650, 345/654–655; 715/500–867; 718/100–108
See application file for complete search history.

(56) References Cited

U.S. PATENT DOCUMENTS 6,334,157 B1 * 12/2001 Oppermann et al. ........ 719/310

OTHER PUBLICATIONS

Lin, Mike. "Taskbar Commander" (1999).*
Philippot, Patrick. "Rearrange Your Taskbar Buttons", PCMag.com (Dec. 2001).*
Chang, Alexander. "A Better Windows", (2002).*
Smith et al. "GroupBar. The TaskBar Evolved." Proceedings of OZCHI 2003 (2003).*
Fotinis, Elias. "TaskArrange v1.1.1". (2005).*

* cited by examiner

*Primary Examiner*—Lewis A. Bullock, Jr.
(74) *Attorney, Agent, or Firm*—IBM Corporation

(57) ABSTRACT

Provided for run time ordering open tasks are a status bar; a plurality of task tabs presented in the status bar in sequential order, with a task tab for each open task within an open application; a content window for displaying task content associated with a current selected task tab; a linked list of tab elements, with a tab element associated with each task tab and task content; and a task tab order component responsive to user drag and drop of a given task tab for moving the given task tab from a drag position in the status bar to a drop position in the status bar.

3 Claims, 3 Drawing Sheets

SYSTEM AND METHOD FOR REARRANGING RUN-TIME ORDERING OF OPEN TASKS

BACKGROUND OF THE INVENTION

1. Technical Field of the Invention

This invention pertains to task ordering in computer applications. More particularly, it relates to run-time ordering of open application tasks.

2. Background Art

In Lotus Notes, a plurality of tasks (document, database, web page, or the like) may be opened within an open application. As each task or window is opened, a tab is added to a status line with each tab attached to an open task. These window tabs show a list of all the currently open windows and prove a way for a user to switch to any of the open application tasks with a single click. The order in which these window tabs are displayed is the order in which each application is opened. However, some users would prefer to have these tabs appear in a different order, an order which makes more sense to the user in the context of the overall application. There is a need in the art to provide users with the capability to customize tab order in a status line.

Similarly, in Microsoft Windows, inside an application, as a task is opened a tab is added to a status line that shows open tasks. Each open task is attached to or associated with an open document or the like.

In an application where tasks are associated with documents, for example, as each document is opened the associated document tab is created and added at the end of the list of document tabs in the status line. As a document is closed, its associated tab is removed from the list. Similar operations occur for data base and spreadsheet tasks within open data base and spreadsheet applications, respectively.

The tab list is in sequential ordering. Thus, a user may by selecting a particular keyboard key or key combination, or mouse key, open tasks within the application in the sequential order in which they were originally opened. The user may also, by selecting some other keyboard key, key combination, or mouse key, open tasks with the application in the reverse order to that in which they were originally opened. In Lotus Notes, for example, a user selects the control-tab key combination to move from task to task in sequential order and the control-shift-tab key combination to move from task to task in reverse sequential order.

A user may select any open task irrespective of its sequential ordering by clicking on the task tab with the mouse.

Heretofore, because the sequential ordering of tasks was set in the order in which the tasks were opened, in order to move sequentially through the tasks in a different order, it has been necessary either to click on the task tab or else close and reopen tasks in the order now desired. This is a tedious, slow and sometimes annoying operations.

Consequently, there is a need in the art to provide to a user a capability for reordering the sequential order of open tasks within an application such that with relative ease a user may use keys or key combinations to quickly and sequentially or reverse sequentially bring to the active window tasks in any desired order.

Therefore, it is an object of the invention to provide an improved system and method for ordering tasks for sequential execution.

It is a further object of the invention to provide an improved system and method for keyboard activation of open tasks in sequential or reverse sequential order.

It is a further object of the invention to provide a system and method for reordering tabs associated in a status line with a plurality of open tasks.

It is a further object of the invention to provide a system and method for user customization of open task tab order in a status line.

SUMMARY OF THE INVENTION

A system and method for run time ordering open tasks. A task tab for each open task is sequentially ordered in a status line. Responsive to a user drag and drop of a first task tab, the sequential order of task tabs is reordered within said status line.

In accordance with an aspect of the invention, there is provided a computer program product configured to be operable for run time ordering open tasks according to steps including providing for each open task a task tab sequentially ordered in a status line; and responsive to a user drag and drop of a first task tab, reordering the sequential order of the status line.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
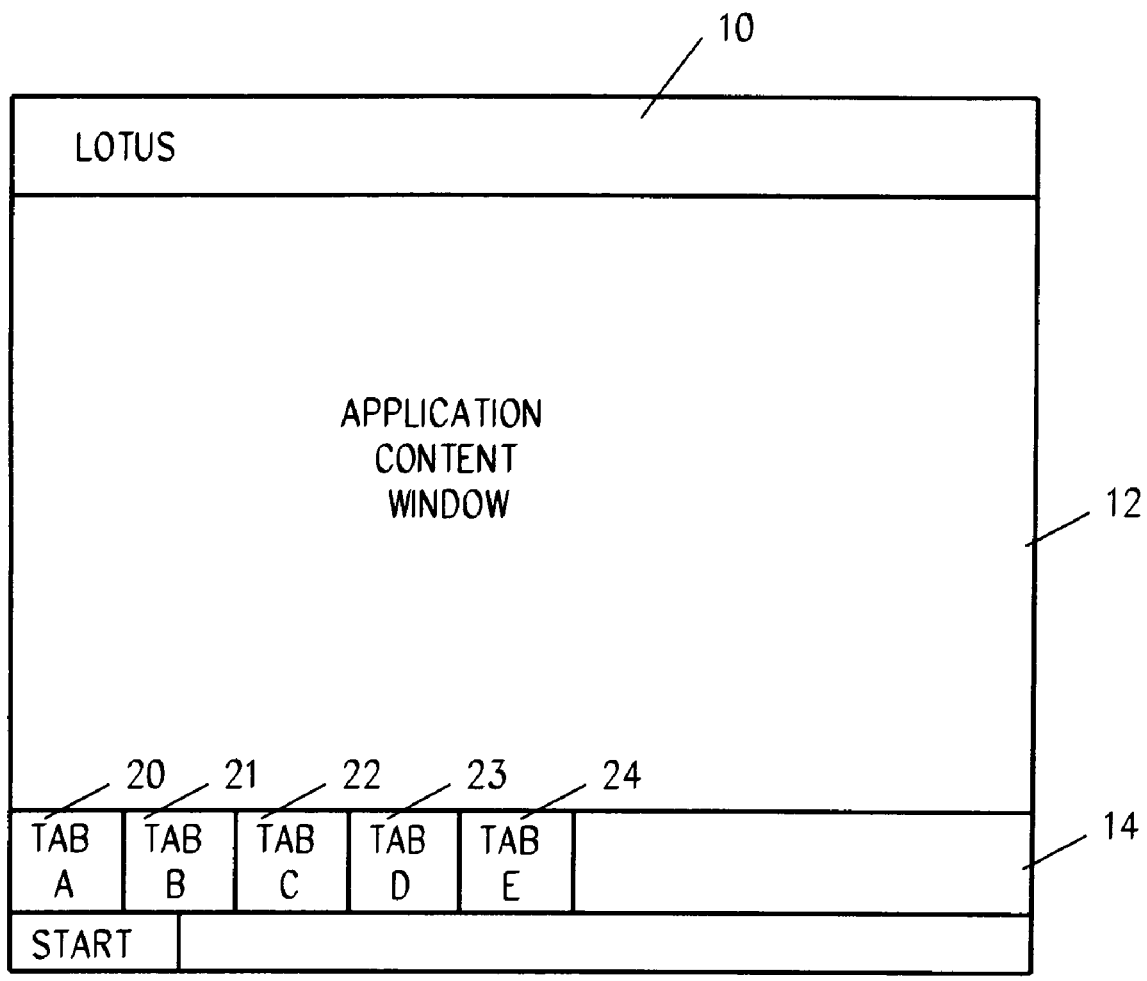
FIG. 1 is a schematic representation of an application window showing an open task status line in accordance with a preferred embodiment of the invention.

Referring to FIG. 1, in accordance with a preferred embodiment of the invention, a plurality of tasks may be opened within an open application. As each task is opened, a tab 20–24 is added to the end of a status line 14 with each tab attached to an open task. As a task is closed, its associated tab is removed from the tab list, and tabs to the right of the removed tab are each moved one position to the left or towards the start of the tab line.

In an exemplary embodiment of the invention, in Lotus Notes 10 a task may be a document, a spread sheet, a data base, one or more of which may be displayed in application content window 12. If more than one task is displayed, they may be tiled, cascaded or otherwise arranged in separate windows within application content window 12. Generally, a task may be any object a plurality of which may be opened within an application and associated with a tab 20–24 in a sequentially ordered status line or bar 14.

Tabs 20–24 are initially ordered in the sequential order in which corresponding tasks A–E are opened.

Assuming that tab C 22 is associated with an application task currently presented in application content window 12, the user may replace window 12 with content associated with task D by selecting the key combination control-tab, and may bring up task B by selecting the key combination control-shift-tab. The user may also select any task irrespective of its sequential order by clicking on the associated tab.

In accordance with a preferred embodiment of the invention, the user may drag and drop a tab to a different tab position in status bar 14. Thus, to change the sequential order of tasks form ABCDE to BCADE, the user drags tab 20 from its current position and drops it between tabs 22 and 23. Thereafter, selecting control-tab brings up tasks in the order BCADE, and selecting control-shift-tab brings up tasks in the order EDACB. ("Brings up" refers to opening a task in application window 12 or, if there are more than one task tiled, cascaded or otherwise presented in application window 12, brings a task to the forefront.)

Figure 2:
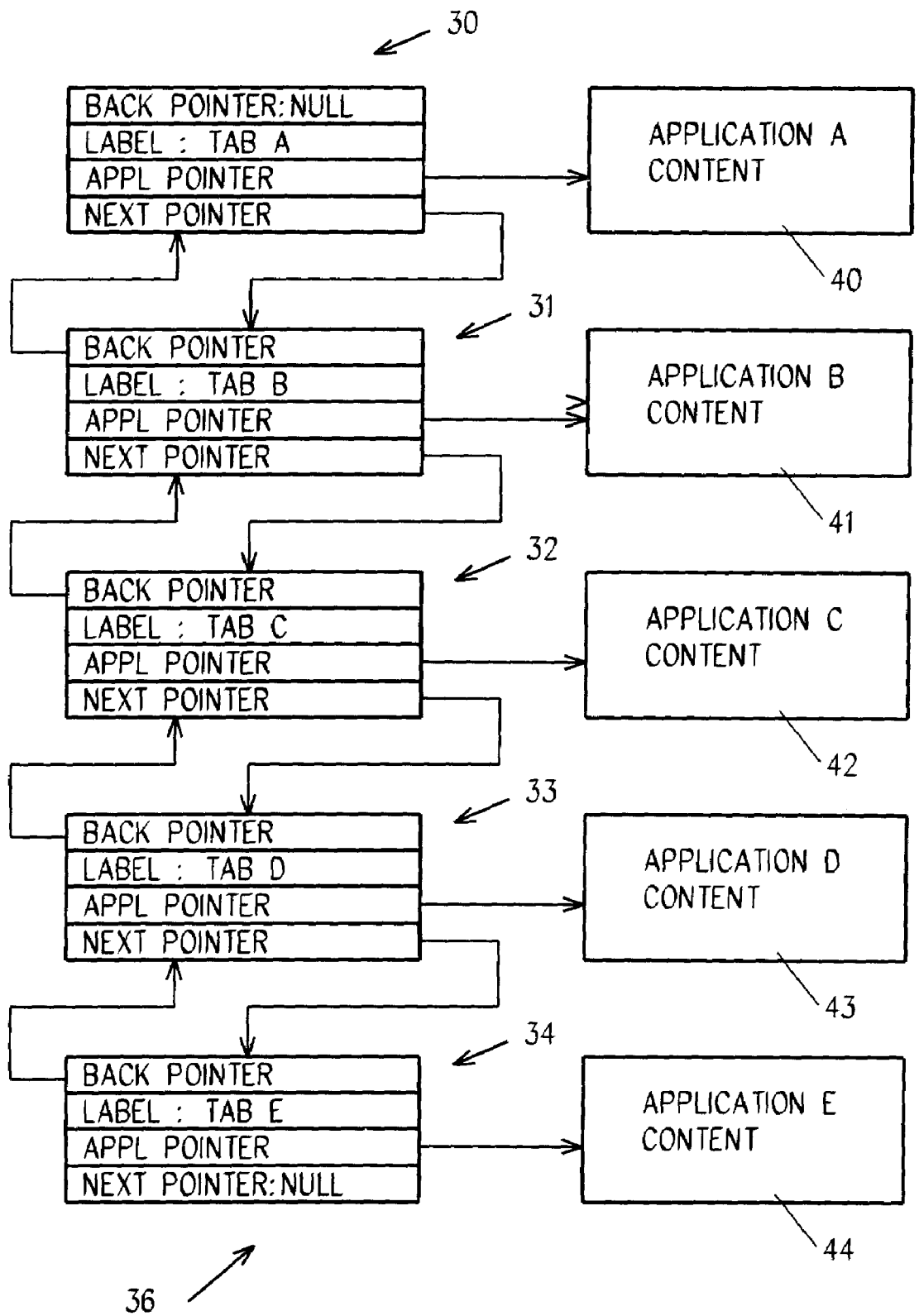
FIG. 2 is a schematic representation of data structures associating open task tabs with task content in a manner by which tabs and tasks may be reordered in accordance with a preferred embodiment of the invention.

Referring to FIG. 2, in accordance with an exemplary embodiment of the invention, as an application task is opened, a tab label is created and associated with its task content, and added to linked list 36. Each tab element 30–34 in linked list 36 includes a back pointer, a tab label, a pointer to associated task 40–44, and a next pointer. The back pointer of the first tab element 30 in linked list 36 is set to null, as is also the next pointer in the last tab element 34 in linked list 36. As the user drags and drops a tab 20–24, the back pointer and next pointer of the associated tab element and adjacent tab elements in linked list 36 are adjusted to the new order.

Tabs 20–24 are displayed in status bar 14 in the order of their respective label elements 30–34 in linked list 36. While shown in a horizontal bar, tabs 20–24 may also be arranged in a vertical bar or by way of a drop down list.

Referring to FIG. 2, tab element pointers in linked list 36 are adjusted as follows to move tab element 30 to a position between tab element 32 and 33 in response to the user dragging tab A 20 to a new position between tab C 22 and tab D 23. The back pointer of tab element 30 is set to point to tab element 32; next pointer of tab element 30 is set to point to tab element 33; back pointer of element 31 is set to null; next pointer of element 32 is set to element 30; back pointer of element 33 is set to element 30. As a result, tabs now appear in status line 14 in the order tab B 21, tab C 22, tab A 20, tab D 23 and tab E 24; user selection of control-tab brings application content 40–44 to window 12 in the order 41, 42, 40, 43, 44; and user selection of control-shift-tab brings application content 40–44 to window 12 in the order E 44, D 43, A 40, C42, and B 41. The user may still select any application 40–44 by clicking one of tabs 20–24, irrespective of sequential order of linked list 36.

Figure 3:
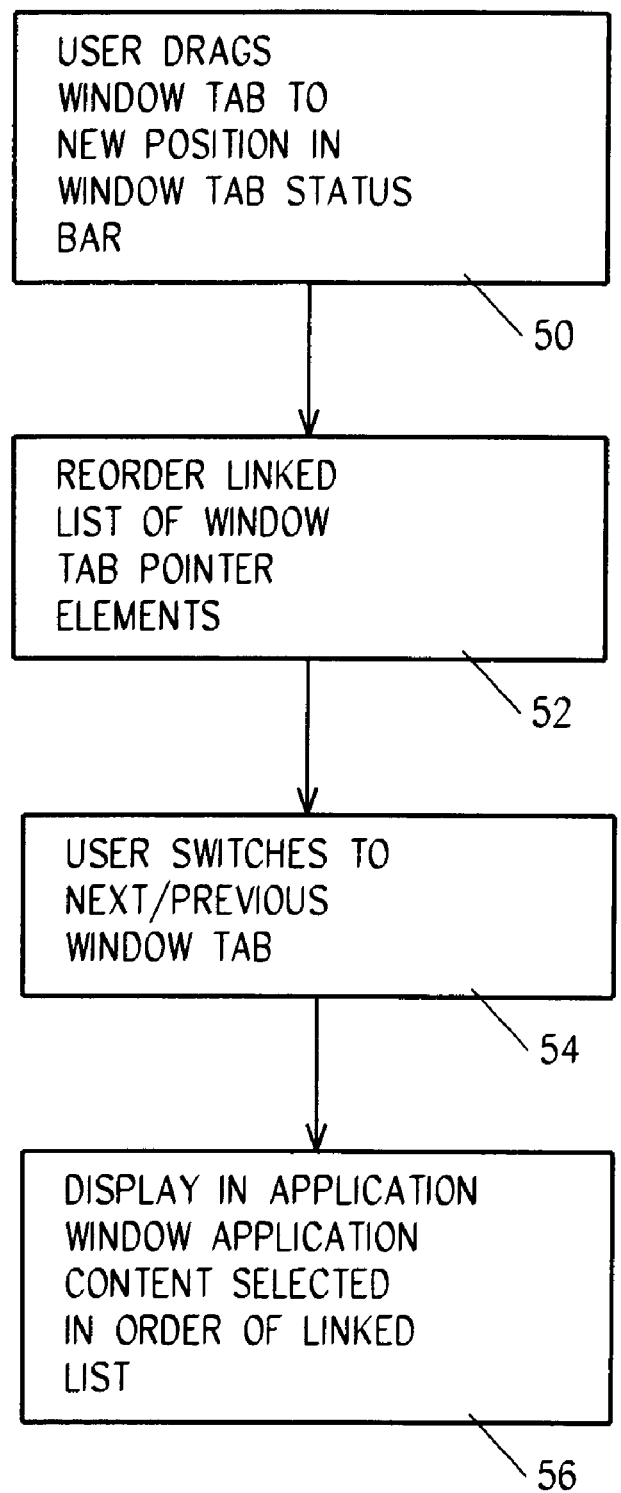
FIG. 3 is a flow diagram illustrating the basic steps of a preferred embodiment of the method of the invention.

Referring to FIG. 3, in accordance with a preferred embodiment of the method of the invention, in step 50 a user drags a window tab, say 20, to a new position in tab line 14, say between tabs C 22 and D 23. In step 52, the system reorders linked list 36 as described above to move tab element 30 between tab elements 32 and 33. In step 54, user selects key combination control-tab or control-shift-tab to select applications in sequential or reverse sequential order, respectively. In step 56, the system responds by displaying in window 12 application content 40–44 in the sequential or reverse sequential order, as the case may be, established by the then current order of linked list 36, beginning from the tab 20–24 previously selected.

ADVANTAGES OVER THE PRIOR ART

It is an advantage of the invention that there is provided an improved system and method for ordering tasks for sequential execution.

It is a further advantage of the invention that there is provided an improved system and method for keyboard activation of open tasks in sequential or reverse sequential order.

It is a further advantage of the invention that there is provided a system and method for reordering tabs associated in a status line with a plurality of open tasks.

It is a further advantage of the invention that there is provided a system and method for user customization of open task tab order in a status line.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device, such as tape or disc, or the like for storing signals readable by a machine; or communications medium, such as a solid or fluid transmission medium, magnetic or optical wire, or the like for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

I claim:

1. A computer-implemented method for run time ordering open tasks displayed at the user interface of a computer display, comprising the steps of:

providing for each open document, web-page, database, and spreadsheet task selectively tiled, cascaded and otherwise arranged in separate windows within an application content window at said user interface a task tab sequentially ordered in a status line selectively arranged in a horizontal bar, a vertical bar, and by way of a drop down list;

responsive to a user drag and drop of a first task tab, reordering the sequential order of said status line;

providing a linked list of tab elements, with a tab element associated with each said task tab and task content, each said tab element including a back pointer to a previous tab element in said linked list, a tab label, a pointer to one of said open tasks, and a next pointer to a next tab element in said linked list;

said reordering step comprising the step of adjusting said back pointer and said next pointer of said tab element to reposition said first tab element from a drag position to a drop position within said linked list;

displaying in an application content window task content corresponding to a current selected task tab;

responsive to user selection of a new task tab of displaying task content corresponding to said new task tab in said application content window;

responsive to user selection of a first key combination, displaying task content corresponding to a next sequential task in said application content window; and responsive to user selection of a second key combination, displaying task content corresponding to a previous sequential task in said application content window.

2. A system for run time ordering open tasks displayed at the user interface of a computer terminal, comprising:
- a computer display device for displaying said user interface;
- said user interface including a status bar;
- a plurality of task tabs presented in said status bar in sequential order, with a task tab for each open document, web-page, database, and spreadsheet task within an open application selectively tiled, cascaded and otherwise arranged in separate windows within an application content window at said user interface;
- a content window for displaying task content associated with a current selected task tab;
- a linked list of tab elements, with a tab element associated with each said task tab and task content, each said tab element including a back pointer to a previous tab element in said linked list, a tab label, a pointer to one of said open tasks, and a next pointer to a next tab element in said linked list;
- a task tab order component responsive to user drag and drop of a given task tab for moving said given task tab from a drag position in said status bar to a drop position in said status bar by adjusting said back pointer and said next pointer of said tab element to reposition said first tab element from a drag position to a drop position within said linked list;
- a mouse device operable by a user for selecting a current task tab;
- a first key operable by said user for incrementing said selected task tab to a next tab in said sequential order;
- a second key operable by said user for decrementing said selected task tab to a previous tab in said sequential order;
- said task tab order component being operable to reorder said linked list of tab elements responsive to said user drag and drop.

3. A computer program product for ordering open tasks displayed at the user interface of a computer, comprising:
- a computer memory device;
- first program instructions for providing for each open document, web-page, database, and spreadsheet task selectively tiled, cascaded and otherwise arranged in separate windows within an application content window at said user interface a task tab sequentially ordered in a status line selectively arranged in a horizontal bar, a vertical bar, and by way of a drop down list;
- second program instructions, responsive to a user drag and drop of a first task tab, for reordering the sequential order of said status line;
- third program instructions for providing a linked list of tab elements, with a tab element associated with each said task tab and task content, each said tab element including a back pointer to a previous tab element in said linked list, a tab label, a pointer to one of said open tasks, and a next pointer to a next tab element in said linked list;
- fourth program instructions for adjusting said back pointer and said next pointer of said tab element to reposition said first tab element from a drag position to a drop position within said linked list;
- fifth program instructions for displaying in an application content window task content corresponding to a current selected task tab;
- sixth program instructions, responsive to user selection of a new task tab, for displaying task content corresponding to said new task tab in said application content window;
- seventh program instructions, responsive to user selection of a first key combination, for displaying task content corresponding to a next sequential task in said application content window;
- eighth program instructions, responsive to user selection of a second key combination, for displaying task content corresponding to a previous sequential task in said application content window; and wherein
- said first, second, third, fourth, fifth, sixth, seventh, and eighth program instructions are recorded on said computer memory device.

* * * * *